United States Patent [19]

Barker, Sr. et al.

[11] Patent Number: 4,687,101
[45] Date of Patent: Aug. 18, 1987

[54] DISK PROTECTOR/HOLDER

[76] Inventors: John L. Barker, Sr.; John L. Barker, Jr., both of 2043 Lancer, Troy, Mich. 48084

[21] Appl. No.: 789,650

[22] Filed: Oct. 21, 1985

[51] Int. Cl.⁴ .................. B65D 85/30; B65D 85/57
[52] U.S. Cl. ............................ 206/444; 206/312; 206/453
[58] Field of Search .......... 206/444, 309, 312, 313, 206/453, 456; 360/133

[56] References Cited

U.S. PATENT DOCUMENTS

| 2,333,798 | 11/1943 | Kner |  |
| 2,480,416 | 8/1949 | Modes | 206/62 |
| 2,725,143 | 11/1955 | Linebaugh et al. | 206/62 |
| 3,112,966 | 12/1963 | Reid | 312/10 |
| 3,207,318 | 9/1965 | Gilbert | 206/309 |
| 3,317,038 | 5/1967 | Bade et al. | 206/313 |
| 3,826,360 | 7/1974 | Shore | 206/313 |
| 3,942,639 | 3/1976 | Cournoyer et al. | 206/444 |
| 3,987,900 | 10/1976 | Tadokoro et al. | 206/313 |
| 4,072,229 | 2/1978 | Lloyd et al. | 206/309 |
| 4,247,002 | 1/1981 | Horian | 206/313 |
| 4,443,874 | 4/1984 | Steenberg | 369/291 |
| 4,463,849 | 8/1984 | Prusak et al. | 206/307 |

FOREIGN PATENT DOCUMENTS

| 1002731 | 2/1957 | Fed. Rep. of Germany | 206/425 |
| 1062452 | 7/1959 | Fed. Rep. of Germany | 206/312 |
| 584862 | 11/1958 | Italy | 206/312 |
| 1055964 | 1/1967 | United Kingdom | 206/313 |
| 2023096 | 12/1979 | United Kingdom | 206/313 |

Primary Examiner—Stephen Marcus
Assistant Examiner—Brenda J. Ehrhardt
Attorney, Agent, or Firm—Basile, Weintraub & Hanlon

[57] ABSTRACT

A protector/holder for a computer, video or phonograph disk. The protector/holder is in the form of a housing having spaced top and bottom wall surfaces, two opposed side walls and an enclosed bottom edge forming a three sided closed enclosure with an open top end. The spaced edges of the top and bottom wall surfaces at the open top end are formed with inwardly tapering surfaces. The bottom wall surface extends a short distance beyond the length of the outer edge of the top wall surface. A pair of aligned slots are formed centrally within the top and bottom wall surfaces adjacent the open edges to provide access to the disk contained within the housing. An outwardly tapering notch is formed interiorally within the housing at the bottom end of the housing to securely receive the bottom edge therein.

3 Claims, 3 Drawing Figures

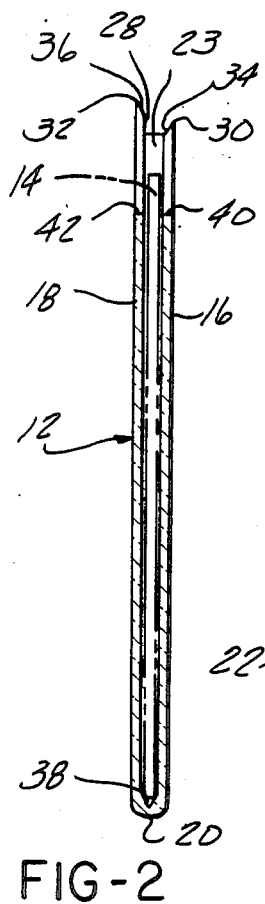
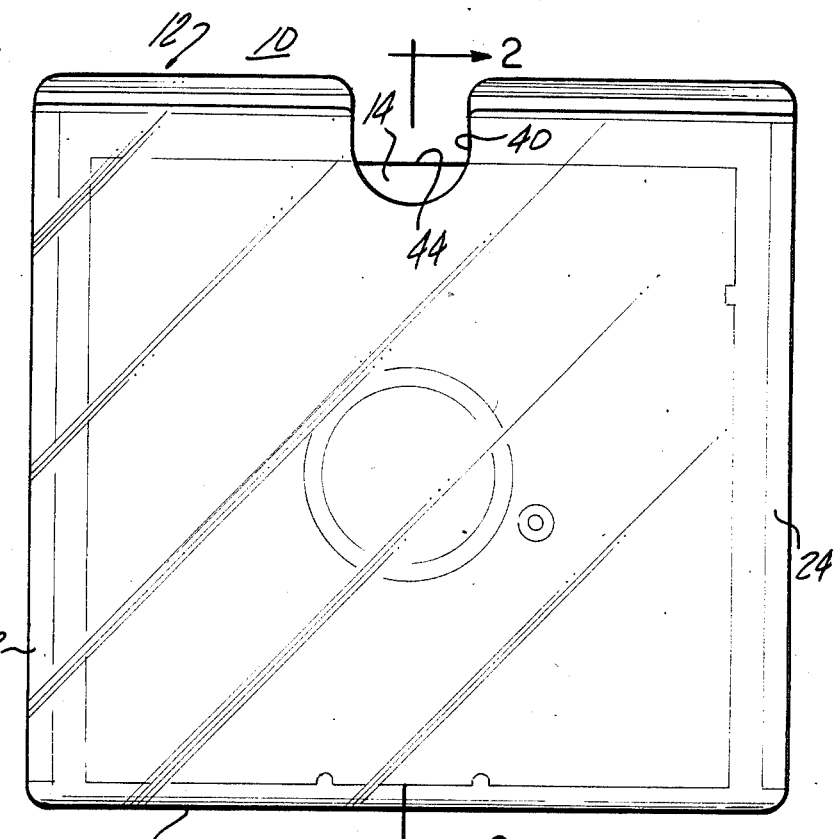
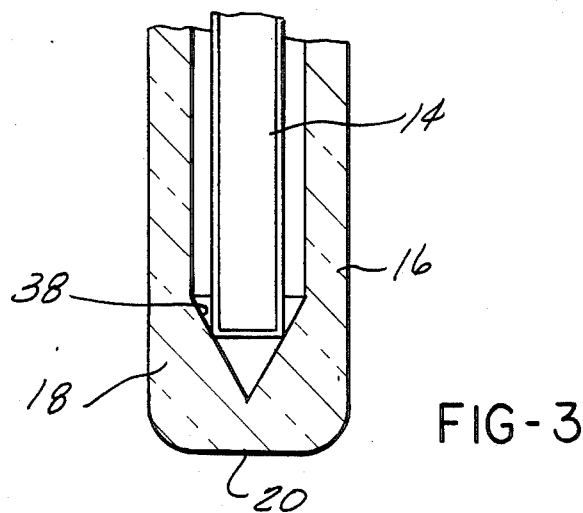
FIG-1
FIG-2
FIG-3

DISK PROTECTOR/HOLDER

BACKGROUND OF THE INVENTION

1. Field of the Invention

The present invention relates in general to article holders and, specifically, to article holders and protectors for planar articles and, even more specifically, to article holders and protectors for flexible computer disks, such as floppy disks.

2. Description of the Prior Art

Containers or envelopes have long been used to protect flat articles, such as phonograph records, during handling and storage. Typically, such containers or envelopes have been formed of heavy paper, such as cardboard. While such a container provides a small amount of protection to the record, the container itself is subject to deterioration over long use which could impair the safety of the article, such as the phonograph record housed therein.

Typically, such containers are provided with opened top and bottom surfaces which are connected by side walls and a bottom thereby leaving an open slot for insertion or removal of the article, such as the phonograph record or magnetic computer disk therefrom. A slot may also be provided centrally on both of the open edges of the top and bottom surfaces to enable insertion or removal of the article from the container.

Containers or article holders have also been developed for storing computer disks, such as flexible or so-called "floppy disks". While the disks themselves are sealed in a thin paper envelope, such containers, typically formed of a plastic material, have also been utilized to protect the disk during storage and/or handling. However, such previously devised disk holders, while again providing a small degree of protection for a portion of the computer disk beyond that provided by the paper jacket or envelope, nevertheless, have not provided protection for the entire disk.

Thus, it would be desirable to provide an article protector/holder suitable for receiving flexible computer or video disks which overcomes the deficiencies associated with the use of previously devised disk protector/holders. It would also be desirable to provide a disk holder which is both inexpensive to manufacture and enables convenient insertion and removal of the disk from the holder. It would also be desirable to provide such a disk protector/holder which enables easy viewing of the label on a disk contained therein. It would also be desirable to provide a disk holder which securely retains the disk within the holder during transport and/or handling. Finally, it would be desirable to provide a disk protector/holder which protects the entire disk from bending, puncture, dust and liquids during the transport and/or handling.

SUMMARY OF THE INVENTION

The present invention is a disk protector/holder for a computer, video, etc., disk which is formed with a substantially square or rectangular housing having top and bottom major surfaces or walls which are integrally joined together by two opposed side walls and a bottom wall thereby forming a three sided, closed housing. One end of the housing, opposite from the bottom wall is open and forms a slot for insertion or removal of a planar article, such as a computer or video disk therefrom.

The spaced open edges of the top and bottom major surfaces of the housing are provided with inwardly tapering surfaces. Further, the bottom major wall surface extends outward a short distance beyond the outer edge of the top wall surface to provide a lip which enables easy insertion of the magnetic disk into the housing.

A pair of aligned slots having offset edges extend downward a short distance from the open edges of the top and bottom wall surfaces to enable the user to grasp the upper edge of the disk to enable its removal from the housing. Finally, the bottom edge surface of the housing is formed with an outwardly extending, V-shaped notch which receives the bottom edge of the disk to securely retain the disk within the holder and prevent its inadvertent slippage from the holder during transport or handling.

The unique disk protector/holder of the present invention overcomes many of the problems encountered with previously devised disk protector/holders insofar as providing a convenient and inexpensive means for protecting an entire computer or video disk from bending, punctures, liquids, dust and other debris and particularly the exposed areas of a computer magnetic disk. In addition, the open edges of the disk protector/holder of the present invention are formed with inwardly tapering surfaces to provide a lip for easy insertion of the disk into the holder. Further, the disk protector/holder is formed of a transparent plastic material which enables any label on the disk to be easily viewed while the disk is in the housing. The disk protector/holder of the present invention is provided with an internal notch which receives one edge of the disk to retain the disk within the holder during transport or handling. Finally, the disk protector/holder of the present invention enables a computer or video disk to be easily and conveniently transported while the entire disk is completely protected.

BRIEF DESCRIPTION OF THE DRAWING

The various features, advantages and other uses of the present invention will become more apparent by referring to the following detailed description and drawing in which:

FIG. 1 is an elevational view of a disk protector/holder constructed in accordance with the teachings of the present invention;

FIG. 2 is a cross sectional view generally taken along line 2—2 in FIG. 1; and

FIG. 3 is a partial, enlarged, cross sectional view of the bottom edge of the housing shown in FIG. 2.

DESCRIPTION OF THE PREFERRED EMBODIMENT

Throughout the following description and drawing, an identical reference number is used to refer to the same component shown in multiple figures of the drawing.

In general, the present invention is a protector/holder for a computer or video disk and, more preferably, a flexible or so-called magnetic "floppy" disk. The disk protector/holder denoted in general by reference number 10 in FIG. 1 provides a convenient means for temporarily housing a disk during its transporting storage and/or handling prior to its eventual use in a computer disk drive. The disk protector/holder 10 preferably comprises a housing 12 having a substantially square or rectangular configuration slightly larger than the dimensions of a conventional computer magnetic disk. It will be understood, however, that the housing 12 may be configured in various sizes so as to able it to be used with standard 5¼ inch square, 8 inch square or other sized computer magnetic disks as well as video and phonograph disks.

The housing 12 is preferably formed of a lightweight material, such as plastic and, more preferably, a transparent material to enable viewing of any labels which may be mounted on the outer surfaces of a disk 14 when the disk 14 is contained within the housing 12. For example, acrylic or polypropylene may be utilzed to form the housing 12. However, opaque and semitransparent materials may also be employed in any color.

The housing 12 as shown in FIGS. 1 and 2 is formed with spaced, top and bottom, major wall surfaces 16 and 18, respectively. Each of the top and bottom wall surfaces 16 and 18 have a substantially square configuration and are joined together at a bottom end by an integral bottom wall 20 to form a slot 23 therebetween. Side walls 22 and 24 are integrally or separately formed in opposed sides of the spaced top and bottom walls 16 and 18.

As shown in FIGS. 1 and 2, the spaced outer edges 30 and 32 of the top and bottom wall surfaces 16 and 18 are respectively formed with inwardly tapering surfaces 34 and 36. More importantly, the length of the bottom wall 18 is slightly longer than the length of the top wall surface 16 such that the outer edge 32 of the bottom wall surface 18 extends a short distance outward and beyond the outer edge 34 of the top wall 16. This provides a lip or edge to insure easy insertion of the disk 14 into the interior of the housing 12.

As shown in more detail in FIG. 3, the housing 12 is formed adjacent the bottom edge 20 with an upwardly extending and outwardly tapering V-shaped slot 38 which extends along the entire width of the housing 12. The slot 38 is sized to securely receive the bottom edge the disk 14 to securely retain the disk 14 within the housing 12 during handling or transport of the housing 12.

Referring again to FIGS. 1 and 2, the housing 12 is also provided with a pair of aligned slots 40 and 42 which are formed in the top and bottom wall surfaces 16 and 18, respectively. The slots 40 and 42 are preferably centered across the width of the top and bottom wall surfaces 16 and 18 but may alternately be positioned anywhere along the edges of the top and bottom surfaces 16 and 18. The aligned slots 40 and 42 provide an opening through which the upper edge 44 of the magnetic disk 14 contained within the housing 12 extends above the lower surface of the slots 40 and 42 to provide a grasping point for easy removal of the disk 14 from the housing 12.

In summary, there has been disclosed an unique disk protector/holder which provides protection for the entire surface of a computer or video or other disk and, yet, enables easy removal and/or insertion of the disk into and out of the holder as well as complete viewing of any labels on the disk housed therein. The disk protector/holder of the present invention is inexpensive to manufacture and provides protection for the entire disk from bending, punctures, dust, liquids, etc., during transport, handling or storage.

What is claimed is:

1. A disk protector/holder comprising:
   a housing formed of rigid material having spaced top and bottom major wall surfaces, opposed side walls, a closed bottom edge and an open top end;
   a first outer edge of the bottom wall surface adjacent the open top end extending outward a short distance beyond a second outer edge of the spaced top wall surface adjacent the open top end, the first and second outer edges of the top and bottom wall surfaces adjacent the open top end having inwardly tapering surfaces;
   a pair of aligned slots formed in the top and bottom wall surfaces adjacent to the first and second outer edges of the top and bottom wall surfaces and extending downward toward the bottom edge and
   upwardly extending surfaces formed adjacent the bottom edge defining a sharply-angled V-shaped notch between the bottom edge and the top and bottom wall surfaces to securely receive the bottom edge of a planar disk.

2. The disk protector/holder of claim 1 wherein the housing is formed of a transparent plastic.

3. A disk protector/holder comprising:
   a housing formed of a rigid, transparent plastic material, having spaced top and bottom major wall surfaces, opposed side walls, a closed bottom edge and an open top end;
   a first outer edge of the bottom wall surface adjacent the open top end extending outward a short distance beyond a second outer edge of the spaced top wall surface adjacent the open top end;
   the first and second outer edges of the top and bottom wall surfaces having inwardly tapering surfaces;
   an internal, outwardly tapered, V-shaped notch formed between the top and bottom wall surfaces adjacent the bottom edge of the housing and extending upwardly therefrom to securely receive the bottom edge of a disk; and
   a pair of aligned slots formed centrally in the top and bottom wall surfaces adjacent to and extending downward from the first and second outer edges of the top and bottom wall surfaces.

* * * * *